United States Patent [19]

Schechter et al.

[11] Patent Number: 5,275,136
[45] Date of Patent: Jan. 4, 1994

[54] VARIABLE ENGINE VALVE CONTROL SYSTEM WITH HYDRAULIC DAMPER

[75] Inventors: Michael M. Schechter, Farmington Hills; Michael B. Levin, Bloomfield, both of Mich.

[73] Assignee: Ford Motor Company, Dearborn, Mich.

[21] Appl. No.: 57,904

[22] Filed: May 7, 1993

Related U.S. Application Data

[63] Continuation-in-part of Ser. No. 993,746, Dec. 21, 1992, Pat. No. 5,255,641, which is a continuation of Ser. No. 720,115, Jun. 24, 1991, abandoned.

[51] Int. Cl.⁵ ............................................. F01L 9/02
[52] U.S. Cl. .......................... 123/90.12; 123/90.15; 123/90.24; 251/31; 251/47
[58] Field of Search ............. 123/90.11, 90.12, 90.13, 123/90.15, 90.24, 90.49; 251/31, 47

[56] References Cited

U.S. PATENT DOCUMENTS

| | | | |
|---|---|---|---|
| 2,915,052 | 12/1959 | Gullen | 123/90.11 |
| 3,240,191 | 3/1966 | Wallis | 123/478 |
| 3,361,121 | 1/1968 | Schott | 123/90.13 |
| 3,534,718 | 10/1970 | Pasquin | 123/90.13 |
| 3,672,628 | 6/1972 | Aanstad | 251/47 |
| 3,844,528 | 10/1974 | Massie | 251/31 |
| 3,926,159 | 12/1975 | Michelson et al. | 123/90.11 |
| 3,963,006 | 6/1976 | Firey | 123/90.12 |
| 4,200,067 | 4/1980 | Trenne | 123/90.12 |
| 4,552,330 | 11/1985 | Grotloh | 251/31 |
| 4,716,862 | 1/1988 | Sauro | 123/90.12 |
| 4,791,895 | 12/1988 | Tittizer | 123/90.12 |
| 4,794,891 | 1/1989 | Knobloch | 123/90.11 |
| 4,821,689 | 4/1989 | Tittizer et al. | 123/90.12 |
| 4,823,825 | 4/1989 | Buchl | 137/1 |
| 4,887,562 | 12/1989 | Wakeman | 123/90.12 |
| 4,889,085 | 12/1989 | Yagi et al. | 123/90.12 |
| 4,930,464 | 6/1990 | Letsche | 123/90.12 |
| 4,930,465 | 6/1990 | Wakeman et al. | 123/90.12 |
| 4,957,075 | 9/1990 | Hasegawa | 123/90.12 |
| 4,960,083 | 10/1990 | Seki et al. | 123/90.16 |
| 5,113,812 | 5/1992 | Rembold et al. | 123/90.12 |
| 5,158,048 | 10/1992 | Robnett et al. | 123/90.12 |
| 5,193,495 | 3/1993 | Wood, III | 123/90.12 |
| 5,216,988 | 6/1993 | Taxon | 123/90.12 |
| 5,221,072 | 6/1993 | Erickson et al. | 251/47 |

Primary Examiner—E. Rollins Cross
Assistant Examiner—Weilun Lo
Attorney, Agent, or Firm—Roger L. May; Jerome R. Drouillard

[57] ABSTRACT

A variable valve assembly, engine valve control system, and method of operation wherein the valve is hydraulically controlled and includes a valve piston subjected to fluid pressure acting on surfaces at both ends of the valve piston. The cavity at one end of the valve piston is connected to a source of high pressure fluid while the cavity at the other end is connected to a source of high pressure fluid and a source of low pressure fluid, and disconnected from each through action of controlling means such as solenoid valves. The valve assembly includes a damper to limit the velocity of the valve during a portion of the travel of the piston, particularly as the valve head lands on the valve seat.

14 Claims, 5 Drawing Sheets fig-1 fig-4 fig-5a fig-5b fig-5c fig-5d

VARIABLE ENGINE VALVE CONTROL SYSTEM WITH HYDRAULIC DAMPER

CROSS-REFERENCE TO RELATED APPLICATION

This invention is a continuation-in-part of copending U.S. application Ser. No. 993,746, filed Dec. 21, 1992, now U.S. Pat. No. 5,255,641 which is a continuation of application Ser. No. 720,115, filed Jun. 24, 1991, now abandoned.

TECHNICAL FIELD

This invention relates to a system and method for variably controlling hydraulic poppet valves. More specifically, it relates to valve systems of the type in which hydraulic pressure of a pressurized fluid is used through action of solenoid valves to control the motion of the engine valves.

BACKGROUND ART

The enhancement of engine performance attained by being able to vary the acceleration, velocity and travel time of the intake and exhaust valves in an engine is well known and appreciated in the art. However, the technology for providing a straight-forward, relatively inexpensive and highly reliable system has not been forthcoming. Further, increased use and reliance on micro electronic control systems for automotive vehicles and increased confidence in hydraulic as opposed to mechanical systems is now making substantial progress possible. Prior developments in the area of intake and exhaust engine valves are largely dependent upon sophisticated mechanical systems such as mechanically varying phase shift and other aspects of valve timing. Increased use of multiple valve per cylinder engines is also being promoted.

The use or adoption of hydraulically controlled engine valves has been quite slow. Examples of known systems include those as shown in U.S. Pat. Nos. 2,915,052; 3,240,191; 3,361,121; 3,534,718; 3,926,159; 3,963,006; and 4,200,067. In some instances, such as shown in U.S. Pat. No. 3,361,121 a poppet valve is biased in a closed position by a mechanical coil spring, and utilizes a hydraulic actuator to bias the valve in the open position. Several of the aforementioned patents also disclose the use of a rotary distributor valve to alternately couple the hydraulic actuator ports of the valves to a source of pressurized fluid, such as shown in U.S. Pat. Nos. 2,915,052 and 4,200,067. In certain of the aforementioned patents, it is also shown that the hydraulic fluid system is used to both open and close the engine valve, such feature being shown in U.S. Pat. Nos. 2,915,052 and 3,963,006.

However, none of the aforementioned systems provide a variable engine valve control system offering the simplicity, reliability, flexibility and efficiency believed most desirable for use in the high production, high performance automotive engines being produced today and those that will be required in the near future.

Furthermore, when employing hydraulically controlled valves as opposed to mechanical systems, additional noise may be created due to an increased landing velocity of the valve on the valve seat during the valve closing operation if proper control of the valve landing velocity is not maintained by the valve control system.

DISCLOSURE OF THE INVENTION

In its embodiments, the present invention includes a variable hydraulic valve assembly comprising a free moving valve with a valve piston attached to its top. The valve piston is subjected to fluid pressure acting on surfaces at both ends of the valve piston, with the surfaces being of unequal areas. The cavity at one end of the valve piston is connected to a source of high pressure fluid while the cavity at the other end can be connected to a source of high pressure fluid, to a source of low pressure fluid or disconnected from them both through action of controlling means such as solenoid valves.

Selective actuation and de-actuation of the controlling means causes an inflow of pressurized fluid into a cavity at one end of the valve piston and an outflow of fluid from the cavity at the other end of the valve piston, such action leading to a change in the balance of forces acting on the valve piston and causing controlled motion of the valve from one fixed position to another. In moving from one fixed position to the other and back, a damping means limits the velocity of the valve during a portion of its travel.

The inflow of pressurized fluid is the result of fluid expansion from a pressurized container and the outflow of fluid leads to increased fluid compression in the pressurized container.

Moreover, the potential energy of pressurized fluid is converted into kinetic energy of the moving valve during acceleration, and the kinetic energy of the valve is converted back into potential energy of pressurized fluid during valve deceleration, thereby providing what can be referred to as a "liquid spring."

Another feature of the system is the fact that the net fluid flow between the high pressure and low pressure source during operation is significantly less than the volume swept by the valve piston motion.

The timing of the valve opening and closing motions is controlled by varying the timing of the controlling means actuation. The stroke of the valve is determined by the duration of the controlling means actuation. The acceleration, velocity and travel time of the valve is controlled by varying the pressure of the pressurized fluid.

The general system of the present invention as described above may be applied to an engine with more than two valves per cylinder and capable of activating selectively one or several valves simultaneously.

Further, an object is to provide a valve assembly wherein the velocity of the valve closing motion is controlled by the use of a damper, to limit the landing velocity of the valve when it makes contact with the valve seat, during a portion of the valve closing motion.

Accordingly, a hydraulically operated valve assembly is provided comprising a guide sleeve member which includes an enclosed bore and first chamber and a valve shiftable between a first and second position which is provided within the bore and first chamber. The valve has a valve piston coupled to the valve and reciprocable within the first chamber which thereby forms a first and a second cavity which vary in displacement as the valve moves. The guide sleeve member has a high pressure port extending from the first and second cavities and a low pressure port, spaced from the high pressure port, also extending from the first cavity. A damper housing, including a damper chamber, is coupled to the first chamber. And, located within the damper housing and coupled to the valve is a damping means for providing resistance to valve motion during a portion of the valve travel between the first and second positions.

The method of operating the above described valve assembly and damper is accomplished by exposing the first cavity to a low pressure source of fluid to thereby initiate acceleration for a valve closing motion. The low pressure source of fluid is then disengaged. The first cavity is again exposed to a source of high pressure fluid for a predetermined amount of time to begin deceleration of the valve wherein the valve motion will not close the valve completely. The first cavity is then exposed to a low pressure source of fluid to once again initiate acceleration for the valve closing motion, and the damping means is engaged to limit the maximum velocity of the valve before final closure of the valve.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

The present invention provides variable control of valve timing, lift and velocity. The system exploits elastic properties of compressed hydraulic fluid which, acting as a liquid spring, accelerates and decelerates the valve during its opening and closing motions. During acceleration, some of the potential energy of the fluid is converted into kinetic energy of the valve. During deceleration, the energy of the valve motion is returned to the fluid. With the exception of leakage, most of the energy of the fluid is conserved.

Figure 1:
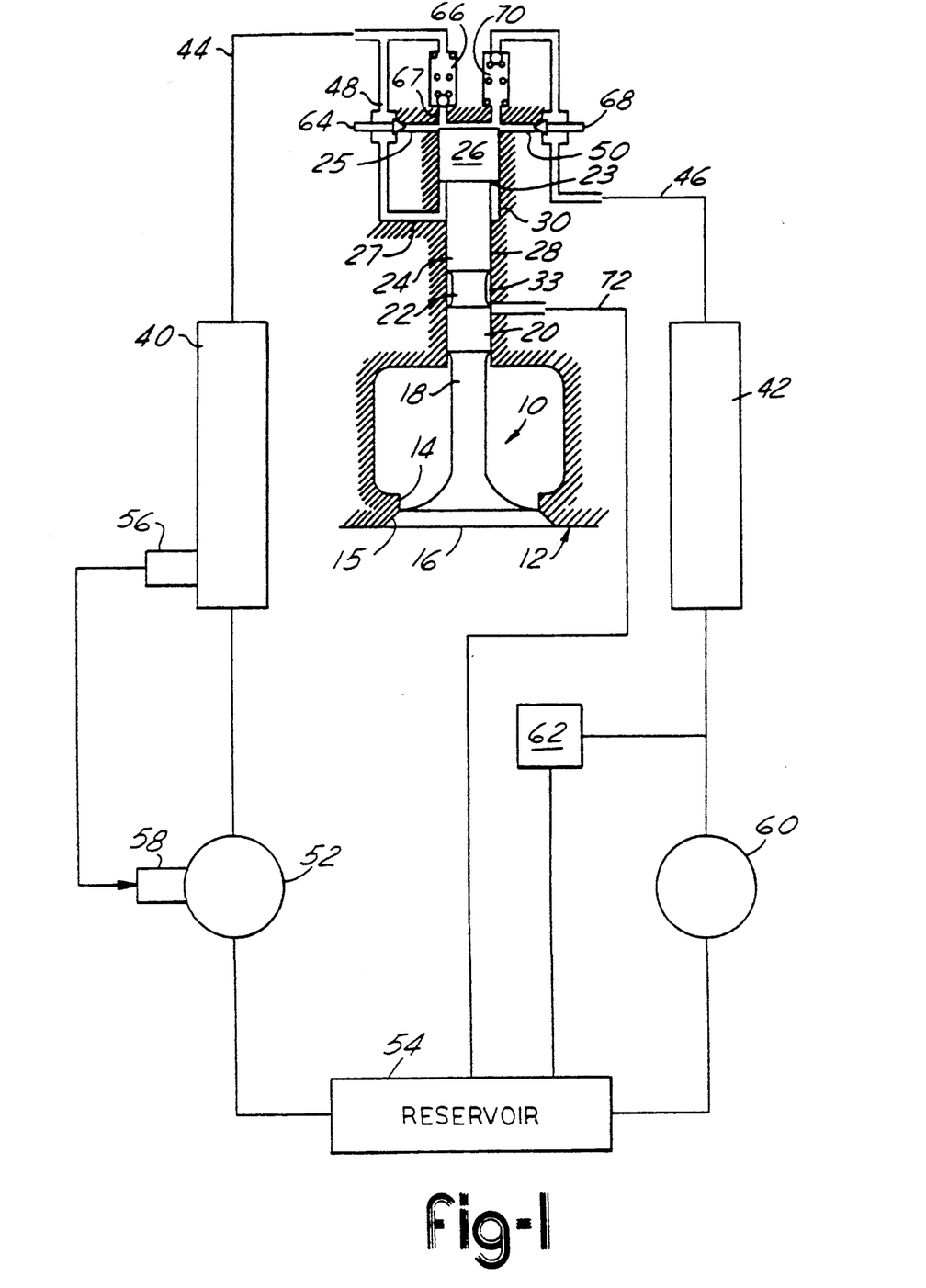
FIG. 1 is a schematic diagram showing a single hydraulically controlled engine valve and the entire hydraulic system for supplying fluid to the valve controlling means in accordance with the present invention.

Features of the present invention are shown in FIG. 1. A valve 10 is located within a cylinder head 12 which includes a port 14, for inlet air or exhaust as the case may be, and a valve seat 15. The valve 10 includes a valve head 16 and a stem portion 18. The valve stem portion 18 includes a series of concentric cylindrical sections 20, 22, 23 and 24 of varying outer diameter. The sections 20 and 24 guide the valve for reciprocation within guide bore 28. Section 23 constitutes an attachment location for a valve piston 26 slidable within the limits of piston chamber 30 which is concentric with guide bore 28. The valve piston 26 forms a first cavity 25 and a second cavity 27 within the chamber 30.

Fluid is selectively supplied to the valve piston 26 from a high pressure rail 40 and a low pressure rail 42 hydraulically connected through lines 44 and 46, respectively, to high pressure port 48 and low pressure port 50, respectively. The second cavity 27, at the lower end of the valve piston 26, is coupled to the high pressure port 48 while the first cavity 25, at the upper end of the valve piston 26, can be coupled to the high pressure port 48, the lower pressure port 50 or disconnected from both through the action of a controlling mechanism.

Hydraulic systems maintaining necessary fluid pressures in the high and low pressure rails 40,42 can be arranged in a variety of ways. The arrangement as illustrated in FIG. 1 includes a variable displacement pump 52 between a reservoir 54 and the high pressure rail 40. Since the fluid in the high pressure rail 40 is subject only to expansion and contraction, the pumping work of the pump 52 is largely limited to that necessary to compensate for internal leakage through clearances. The variable displacement pump 52 may be under automatic control whereby a pressure sensor 56 will produce a pressure feedback signal to a pump controller 58 in the event pressure in the high pressure rail 40 drops below the set minimum required at any particular operating condition. This then varies the pump displacement to maintain the required pressure in the high pressure rail 40. Fluid in the low pressure rail 42 is maintained at a fixed low pressure by means of pressure pump 60 supplying fluid from reservoir 54 and pressure regulator 62.

The first cavity 25 can be connected to the high pressure rail 40 through a solenoid valve 64 or a check valve 66, and to the low pressure rail through solenoid valve 68 or a check valve 70. The second cavity 27 is always connected to the high pressure rail 40. Fluid return line 72 completes the system and provides the means for returning to the reservoir 54 any fluid which leaks from the piston chamber 30 to the return chamber 33, formed between guide bore 28 and the reduced diameter section 22 of the valve 10.

The process of a single valve 10 opening and closing is illustrated in FIGS. 2a–c and 3a–c, respectively. The arrows indicate the direction of fluid flow and valve motion as the case may be.

Figure 2A:
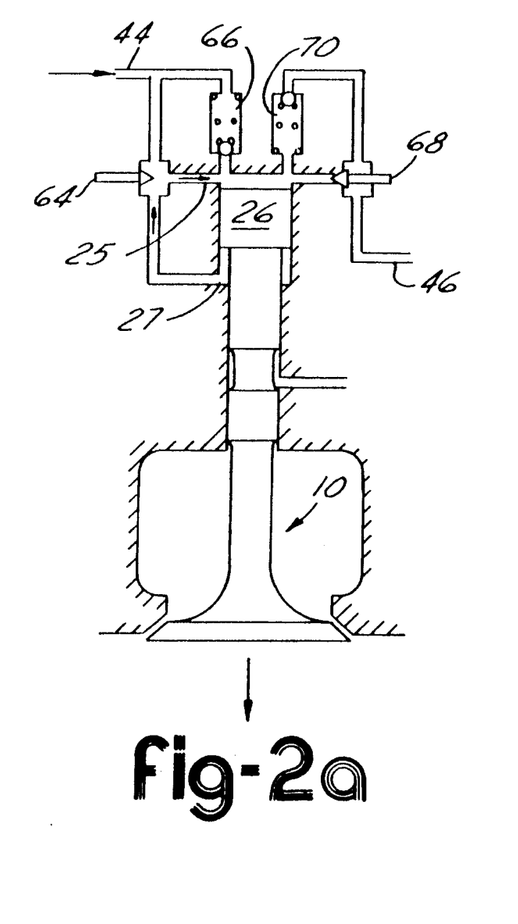
FIGS. 2a, 2b and 2c are schematic elevation views showing a single engine valve and associated valve controlling means, with the valve being shown in three different stages of its being fully opened.
Figure 2B:
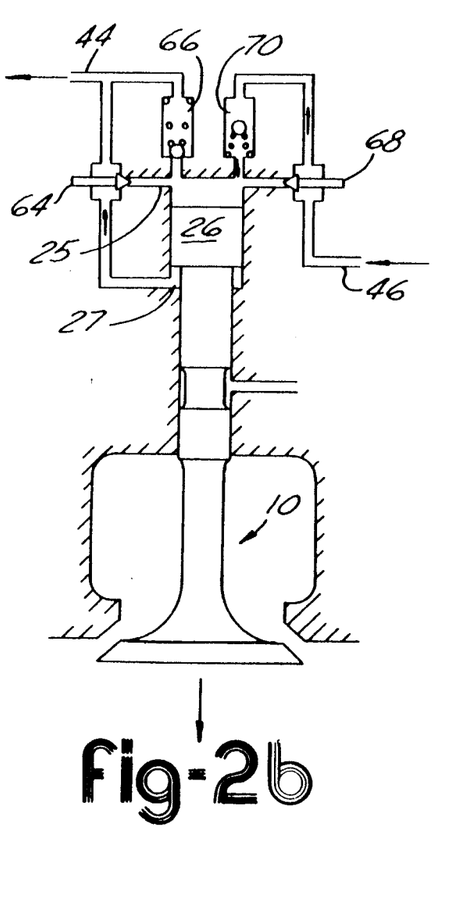
Figure 2C:
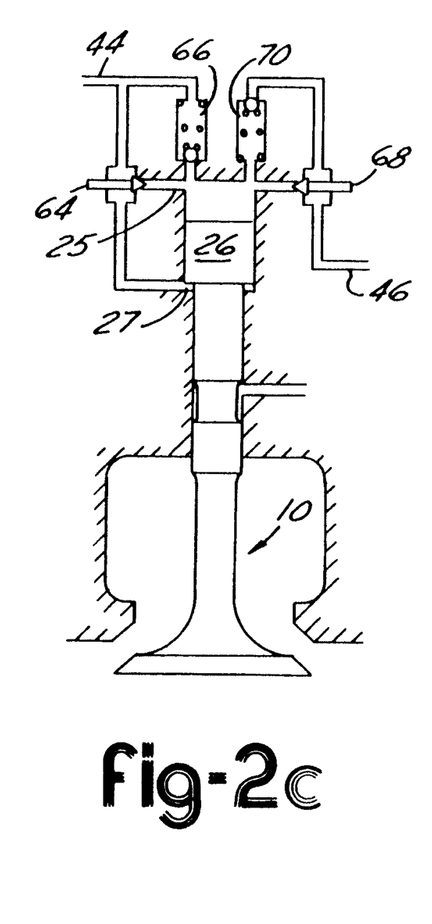

To initiate the valve opening, the solenoid valve 64 opens which causes a net pressure force acting on the valve piston 26 to accelerate the valve downward (FIG. 2a). When the solenoid valve 64 closes, pressure above the valve piston 26 in the first cavity 25 drops, and the piston decelerates pushing the fluid from the volume in the second cavity 27 back into the high pressure line 44 (FIG. 2b). Low pressure fluid flowing through the check valve 70 prevents void formation in the first cavity 25 during deceleration. When the downward motion of the valve 10 stops, the low pressure check valve 70 closes and the valve 10 remains locked in its open position (FIG. 2c).

Figure 3A:
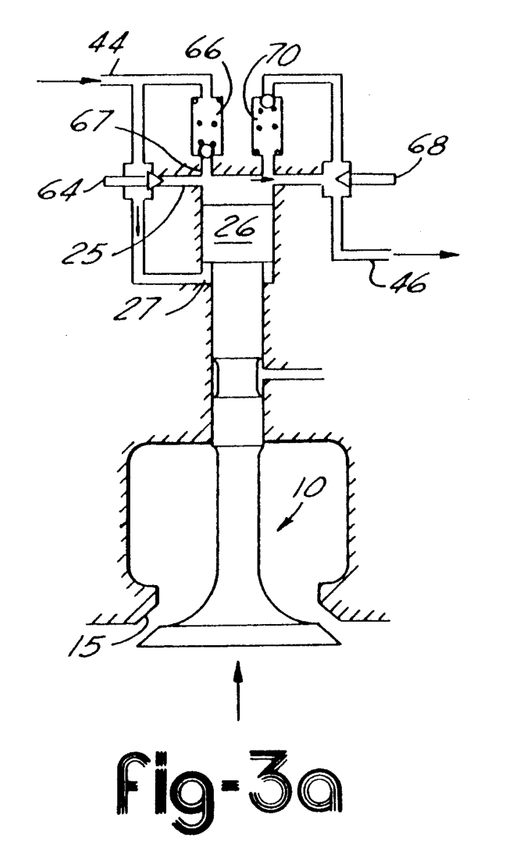
FIGS. 3a, 3b and 3c are schematic elevation views showing a single engine valve and associated valve controlling means, with the valve being shown in three different stages of its being fully closed.
Figure 3B:
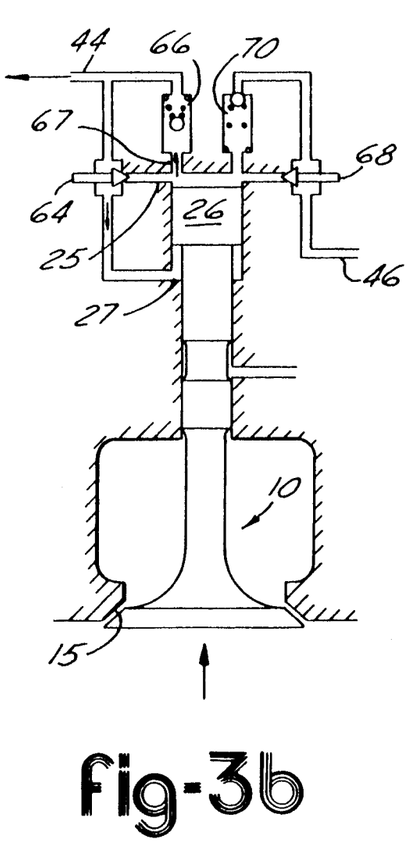
Figure 3C:
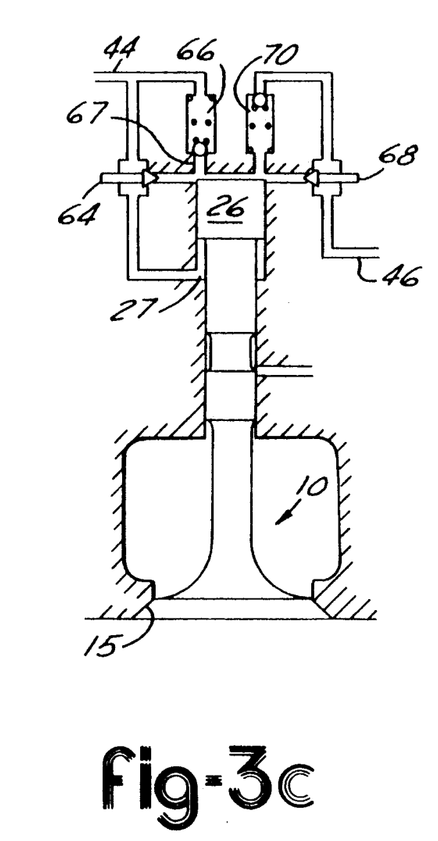

The process of valve closing is similar, in principle, to that of the valve opening. When the solenoid valve 68 opens, pressure in the first cavity 25 drops and the net pressure force accelerates the valve 10 upward (FIG. 3a). Then, the solenoid valve 68 closes and the rising pressure in the first cavity 25 forces fluid through the check valve passage 67 and opens the high pressure check valve 66 (FIG. 3b). The direction of the net pressure force is reversed, and the valve 10 decelerates pushing the fluid from the first cavity 25 back into the high pressure line 44. When the valve 10 exhausts its kinetic energy, the high pressure check valve 66 closes and the valve 10 remains locked in its closed position (FIG. 3c). Increased deceleration of the valve 10 will cause a lower velocity of the valve 10 when it makes contact with the valve seat 15, which velocity is referred to as the landing velocity. A brief reopening of the low pressure solenoid valve 68 at the end of the valve closing assures that the valve 10 is firmly pressed against its seat 15.

Varying the timing of activation of the two solenoid valves 64, 68 varies the timing of the engine valve opening and closing. Valve lift can be controlled by varying the duration of the solenoid voltage pulse. Changing fluid pressure in the high pressure rail 40 permits control of valve acceleration, velocity and travel time. All this permits considerably greater flexibility in engine valve operation control than is possible in conventional cam driven valve trains; flexibility which, in effect, is equivalent to ability to vary the size and the shape of the cam while the engine is running.

To assure proper deceleration of the valve 10 during valve closing in order to limit the landing velocity, a damper is combined with the valve. This design is illustrated in detail in FIG. 4. It shows the valve assembly within a cylinder head 12 of an engine, although this hydraulic valve assembly and damper can be used in applications other than an engine. The engine valve 10, then, is shown located within a cylinder head 12. Like reference numerals are used in this Figure and FIGS. 5a-5d to illustrate structural identity with reference to FIGS. 13, with the exception that the guide bore 28 is shown located within a guide sleeve 29, which itself mounts within a stepped bore 13 in the cylinder head 12.

Figure 4:
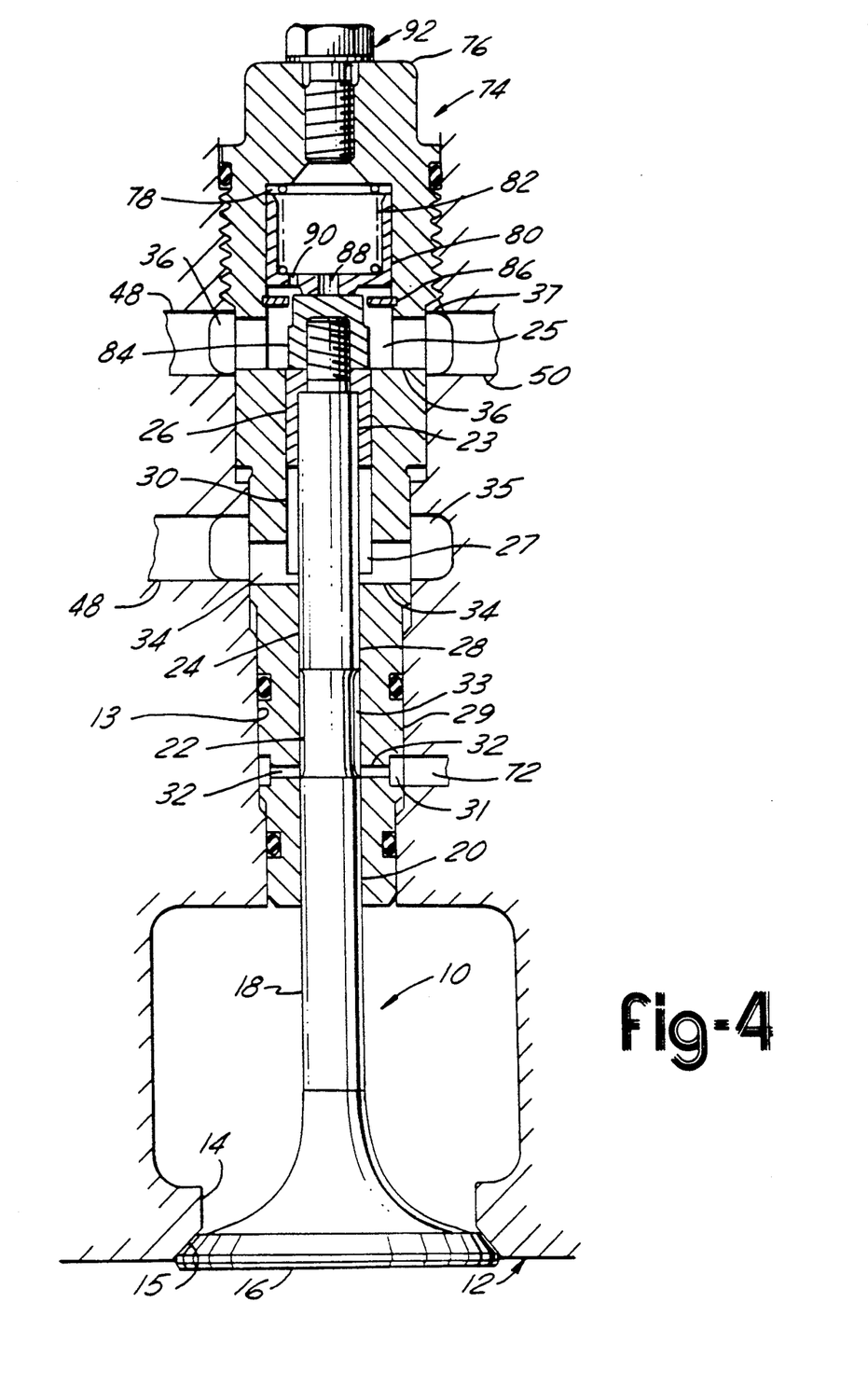
FIG. 4 is an elevational view showing an embodiment of a single hydraulically controlled valve in accordance with the present invention and in its closed position.

The guide sleeve 29 includes a plurality of radially spaced fluid return bores 32 and an annulus 31 coupling the return chamber 33 to the fluid return line 72. The guide sleeve 29 further includes a plurality of radially spaced high pressure bores 34 located adjacent to an annulus 35 in the cylinder head 12 which couples the second cavity 27, in the piston chamber 30, to the high pressure port 48. Additionally, the guide sleeve 29 includes high/low pressure radially spaced bores 36 located adjacent to an annulus 37 within the cylinder head 12 which couples the first cavity 25, in the piston chamber 30, to both the high pressure port 48 and the low pressure port 50. These bores 36 are also adjacent to the hydraulic damper assembly 74.

Mounted within the cylinder head 12 at the upper end of the guide sleeve 29 is the hydraulic damper assembly 74. A damper housing 76, having a chamber 78, slidingly receives a damper piston 80 within the chamber 78. The damper piston 80 separates and seals the piston chamber 30 from the damper chamber 78, except for a large centered orifice 88 and a smaller off-center orifice 90 in the damper piston 80 through which fluid can flow. The engine valve 10 is threaded on its upper end to receive a nut 84, which, when in surface contact with the damper piston 80, blocks off the large orifice 88 in the damper piston 80. Mounted within the damper chamber 78 between the damper piston 80 and the upper end of the chamber 78 is a compression spring 82, which biases the damper piston 80 towards the nut 84. A stop ring 86, mounted within the piston chamber 30, limits the extent of possible downward travel of the damper piston 80 but does not block fluid flow through the orifices 88,90. At the upper end of the damper chamber 78 is a bleeder 92 which is only used for initial elimination of any air within the hydraulic system when assembled.

The process of valve opening is essentially the same as shown in FIGS. 2a-2c. The only difference is that as the valve 10 moves downward, the damper piston 80 is also allowed to move downward under the force of the compression spring 82 until it stops when it comes into contact with the stop ring 86. Since both orifices 88,90 are open, free flow of oil between the two chambers 30,78 is possible and the downward motion of the damper piston 80 is not inhibited. Also, since the nut 84 and damper piston 80 only come into surface contact, the downward engine valve motion is not inhibited either and thus, there is no damping effect on the valve 10.

Figure 5A:
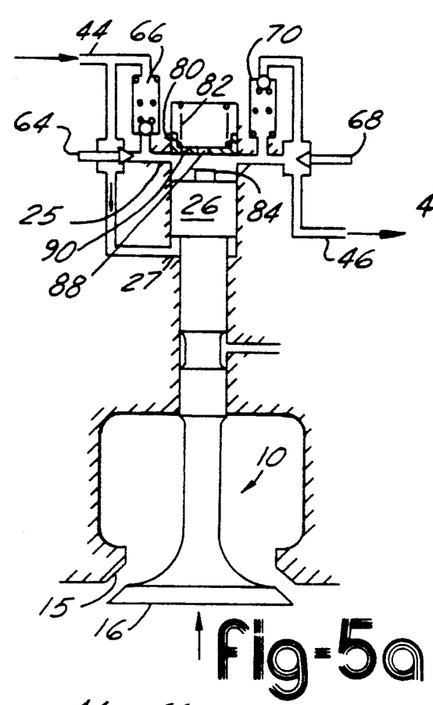
FIGS. 5a, 5b, 5c and 5d are schematic elevation views showing the single valve of FIG. 4 and associated valve controlling means, with the valve being shown in four different stages of its being fully closed.
Figure 5B:
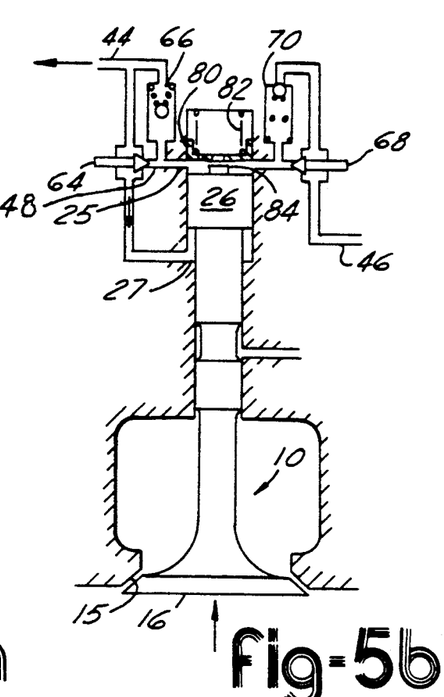
Figure 5C:
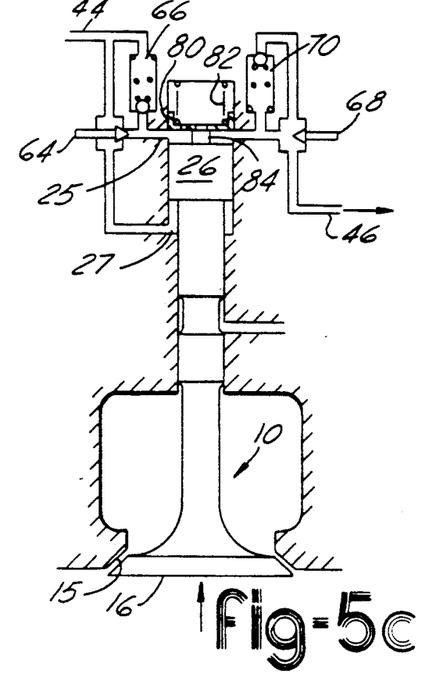

The process of valve closing is illustrated in FIGS. 5a-5d, with the arrows indicating the direction of fluid flow and valve motion as the case may be. To initiate valve closing, the solenoid valve 68 opens and the net pressure force acting on the valve piston 26 accelerates the engine valve 10 upward (FIG. 5a). Then, the solenoid valve 68 closes and the rising pressure in the first cavity 25 opens the high pressure check valve 66 (FIG. 5b). Consequently, the direction of the net pressure force is reversed, and the engine valve 10 decelerates pushing the fluid from the volume in the first cavity 25 back through high pressure port 48 and into the high pressure line 44. The opening and closing of the solenoid valve 68 is timed such that the engine valve 10 exhausts its kinetic energy just as the nut 84 is about to come into contact with the damper piston 80, with a result that the high pressure check valve 66 closes. Then, the solenoid valve 68 is briefly opened again just as the high pressure check valve 66 closes, which causes the upward motion of the engine valve 10 to begin again (FIG. 5c). The initial motion, prior to the solenoid valve 68 briefly opening again, occurs without the damping piston 80 inhibiting the upward motion of the valve 10. Consequently, the valve motion is damped only during a small portion of its upward travel, e.g. in this particular case, only about one millimeter of piston travel is damped. This minimizes the losses of conversion from kinetic energy of the valve 10 to the potential energy of the pressurized fluid. If the valve motion were damped for its entire closing stroke, more losses in energy would occur.

Figure 5D:
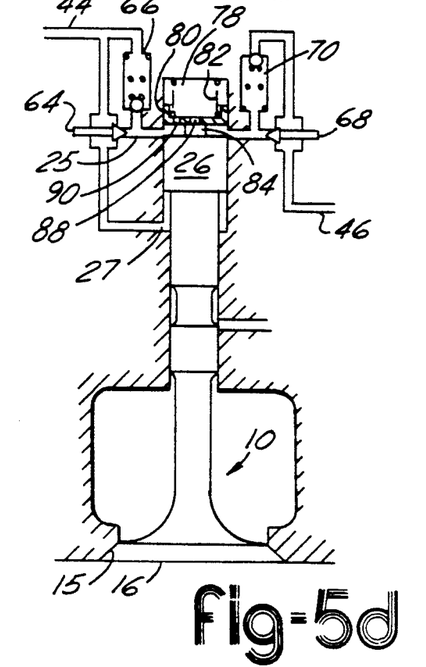

The engine valve motion now is opposed by the damper piston 80 also. Since the large orifice 88 is blocked by the nut 84, fluid, which is displaced by the upward travel of the damper piston 80, can only flow from the damper chamber 78 into the first cavity 25 of the piston chamber 30 through the small orifice 90. Thus, as the upward velocity of the damper piston 80 increases, the velocity of fluid flowing through the small orifice 90 increases and creates a resulting pressure differential between the damper chamber 78 and the first cavity 25 which causes a downward hydraulic pressure force. This damping force counteracts the upward acting hydraulic pressure on the valve piston 26. Accordingly, at a predetermined value of valve velocity, based upon the diameter of the small orifice 90, the two opposing hydraulic forces cancel each other and there is no further increase in engine valve 10 velocity. The engine valve 10 then moves upward at this velocity until the valve head 16 makes contact with the valve seat 15, and the valve 10 remains locked in this closed position (FIG. 5d).

The predetermined value of velocity is determined by the diameter of the small orifice 90. Therefore, by selecting the proper diameter of the orifice, the kinetic energy of the valve at the time of its contact with the seat can be maintained sufficiently small to avoid excessive impact noises and stresses when the valve 10 makes contact with the valve seat 15.

While this valve assembly is shown operating as a single valve, the present invention will also work in multiple valve configurations in which the hydraulic systems and actuators are interconnected. Therefore, while the best mode for carrying out the invention has been described in detail, those familiar with the art to which this invention relates will recognize various alternative designs and embodiments for practicing the invention as defined by the following claims.

We claim:

1. A hydraulically operated valve control system for an internal combustion engine, the system comprising:
   a high pressure source of fluid and a low pressure source of fluid;
   a cylinder head member adapted to be affixed to the engine and including an enclosed bore and chamber;
   a poppet valve shiftable between a first and second position within the cylinder head bore and chamber;
   a hydraulic actuator having a valve piston coupled to the poppet valve and reciprocable within the enclosed chamber which thereby forms a first and a second cavity which vary in displacement as the poppet valve moves;
   the cylinder head member having a high pressure port extending between the first and second cavities and the high pressure source of fluid, and a low pressure port extending between the first cavity and the low pressure source of fluid;
   a high pressure valve and a low pressure valve for respectively regulating the flow of fluid in the first cavity;
   control means cooperating with the high and low pressure valves for selectively coupling the first cavity to the high pressure and low pressure sources to oscillate the poppet valve in timed relation to engine operation, wherein during each oscillation, some of the high pressure fluid used to reciprocate the poppet valve is returned to the high pressure source, thereby allowing that the net fluid flow between the high pressure and low pressure sources may be substantially less than the volume swept by the valve piston;
   a damper housing, including a damper chamber, coupled to the cylinder head chamber and cooperating with the high and low pressure valves; and
   a damper piston biased against the poppet valve near a closed position of the poppet valve, the damper piston slidably enclosed within the damper chamber and including a pressure member disposed between the cylinder head chamber and the damper chamber having means for selectively restricting the flow of fluid between the damper chamber and the cylinder head chamber for restricting the velocity of the poppet valve during a portion of the poppet valve travel between the first and second positions within the cylinder head member.

2. The system of claim 1 wherein the area subject to fluid pressure on one side of the valve piston is larger than area subjected to fluid pressure on the other side of the valve piston;
   the poppet valve accelerating in the direction of poppet valve opening when the control means opens the high pressure valve and decelerating when the high pressure valve closes;
   the poppet valve accelerating in the direction of poppet valve closing when the control means opens the low pressure valve and decelerating when the low pressure valve closes;
   the timing of the high pressure valve opening controlling the timing of the poppet valve opening, and the timing of the low pressure valve opening controlling the timing of the poppet valve closing; and
   the duration of the high pressure valve opening controlling the poppet valve stroke.

3. The system of claim 1 wherein the restricting means comprises a first orifice and a smaller second orifice through the pressure member, the first orifice being aligned with and covered by the poppet valve when in contact with the damper piston and the second orifice being out of alignment with the poppet valve whereby the fluid freely flows through the first and second orifice when the poppet valve shifts from the first position to the second position and only flows through the second orifice when the poppet valve shifts from the second position to the first position.

4. The system of claim 3 wherein the damping means includes a stop ring mounted within the damper chamber between the damper piston and the poppet valve, the stop ring having a central bore such that when the damper is adjacent the stop ring the stop ring will not cover the first or second orifice, whereby the stop ring will limit the travel of the damper piston to less than the travel of the poppet valve from its first position to its second position to thereby limit the restriction of flow through the first orifice to only a portion of the travel of the poppet valve from the second position to the first position.

5. The system of claim 1 wherein the high pressure valve and the low pressure valve are solenoid valves.

6. The system of claim 1 wherein the valve piston includes a pair of ends exposed to opposite respective ends of the enclosed chamber;
   the high pressure valve being located within the first high pressure port and operational to open and close fluid flow to one end of the valve piston;
   the other end of the valve piston being continuously open to the high pressure fluid source;
   the low pressure valve being located within the low pressure port and operational to open and close fluid flow to the one end of the piston; and
   a normally closed pressure relief valve located in the low pressure port intermediate the one end of the piston and the low pressure valve, whereby during the opening and closing of the poppet valve, the potential energy of the fluid from the high pressure fluid source can be utilized to accelerate the poppet valve, thereby increasing the kinetic energy of the poppet valve, and, during deceleration, the kinetic energy of the poppet valve can be utilized to pump the fluid back into the high pressure fluid source, thereby restoring the potential energy of the high pressure fluid.

7. The system of claim 6 wherein the high pressure source includes a second high pressure fluid port hydraulically coupled to the one end of the valve piston, and a normally closed pressure relief valve located in the second high pressure fluid port.

8. The system of claim 1 further including means for converting the potential energy of the fluid into kinetic energy of the reciprocating poppet valve during the poppet valve acceleration and then similarly converting the kinetic energy of the poppet valve into potential energy of the fluid during the poppet valve deceleration.

9. The system of claim 1 wherein the high pressure and the low pressure sources of fluid comprise a respective container filled with pressurized fluid whereby inflow of the fluid into the hydraulic actuator is the result of the fluid expansion from a respective one of the pressurized containers, and outflow of the fluid through said high pressure and low pressure valves increases fluid compression in each respective pressurized container.

10. A hydraulically operated popped valve assembly for an internal combustion engine comprising:
    a guide sleeve member including an enclosed bore and first chamber;
    a poppet valve shiftable between a first and second position within the guide sleeve bore and first chamber;
    a valve piston coupled to the poppet valve and reciprocable within the first chamber which thereby forms a first and a second cavity varying in displacement as the valve moves;
    the guide sleeve member having a high pressure port extending from the first and second cavities and a low pressure port, spaced from the high pressure port, extending from the first cavity; and
    damping means for restricting the velocity of the poppet valve during a portion of the poppet valve travel between the first and second positions within the cylinder head member; said damping means including a damper housing; said damper housing having a damper chamber coupled to the first chamber, and a damper piston slidably enclosed within the damper chamber and engageable with the poppet valve, said damper piston biased against the poppet valve near a poppet valve closed position and including a pressure member disposed between the first chamber and the damper chamber having means for restricting the flow of fluid from the damper chamber to the first chamber, for providing resistance to poppet valve motion during a portion of the poppet valve travel between the first and second positions.

11. The poppet valve assembly of claim 10 wherein the restricting means includes a first orifice and a smaller second orifice through the pressure member, the first orifice being aligned with the covered by the poppet valve when in contact with the damper piston and the smaller second orifice being out of alignment with the poppet valve whereby the fluid freely flows through the first and second orifice when the poppet valve shifts from the first position to the second position and only flows through the smaller second orifice when the poppet valve shifts from the second position to the first position.

12. The poppet valve assembly of claim 11 wherein the damper means includes a stop ring mounted within the damper chamber between the damper piston and the poppet valve, the stop ring having a central bore such that when the damper is adjacent to the stop ring, the stop ring will not cover the first or second orifice, whereby the stop ring will limit the travel of the damper piston to less than the travel of the poppet valve from its first position to its second position to thereby limit the restriction of flow through the first orifice to only a portion of the travel of the poppet valve from the second position to the first position.

13. A method of operating a hydraulically operated poppet valve assembly for an internal combustion engine, the poppet valve assembly having a guide sleeve member including an enclosed bore and first chamber, the poppet valve being shiftable between a first and second position within the guide sleeve bore and first chamber;
    a valve piston coupled to the poppet valve and reciprocable within the first chamber which thereby forms a first and second cavity which vary the displacement as the poppet valve moves;
    the guide sleeve member having a high pressure port extending from the first and second cavities and a low pressure port, spaced from the high pressure port, extending from the first cavity;
    damping means for restricting the velocity of the poppet valve during a portion of the poppet valve travel between the first and second positions within the cylinder head member;
    said damping means including a damper housing;
    said damper housing having a damper chamber coupled to the first chamber, and a damper piston means located within the damper housing and engageable with the poppet valve, for providing resistance to poppet valve motion during a portion of the poppet valve travel between the first and second positions;
    said method comprising:
    exposing the first cavity to a low pressure source of fluid to thereby initiate acceleration for a valve closing motion;
    disengaging the low pressure source of fluid to thereby terminate the acceleration of the poppet valve;
    exposing the first cavity to a source of high pressure fluid for a predetermined amount of time to thereby begin deceleration of the poppet valve whereby the poppet valve motion will not close the poppet valve completely;
    exposing the first cavity to the low pressure source of fluid for a predetermined time to thereby again initiate acceleration for the valve closing motion; and
    engaging the damping means to thereby limit the maximum velocity of the valve before final closure of the poppet valve.

14. The method of claim 13 further comprising:
    exposing the first cavity to a source of high pressure fluid to thereby initiate acceleration for a valve opening motion;
    disengaging the first cavity from the high pressure source of fluid to thereby terminate the acceleration of the poppet valve; and
    exposing the first cavity to a source of low pressure fluid for a predetermined amount of time to thereby begin deceleration of the poppet valve.

* * * * *